Aug. 25, 1959  F. E. SMITH  2,901,095
PARTS FEEDER
Filed July 23, 1956

INVENTOR.
FLOYD E. SMITH
BY
Charles L. Lovercheck
Attorney

United States Patent Office 2,901,095
Patented Aug. 25, 1959

2,901,095

PARTS FEEDER

Floyd E. Smith, Erie, Pa.

Application July 23, 1956, Serial No. 599,503

1 Claim. (Cl. 198—220)

This invention relates to parts feeders and more particularly to the type of parts feeders known as vibratory parts feeders.

This application is a continuation in part of patent application, Serial No. 475,807, filed December 16, 1954, now Patent No. 2,845,169.

Various types of drives for conveyors and parts feeders have been heretofore provided. The prior devices usually attempted to apply a force in an axial direction. The present invention presents an improvement in the said prior application wherein a torsional force is applied to a resiliently supported feeder. The advantage of the driving mechanism disclosed herein is that the force may be applied at a greater distance from the axis of the feeder and, therefore, makes it possible to have a greater movement of the motor parts for a given angular movement of the feeder. Also, a greater torsional movement can be applied for a given force at the motor.

It is, accordingly, an object of this invention to provide a parts feeder which is simple in construction, economical to manufacture, and simple and efficient in operation.

Another object of the invention is to provide a new type of driving mechanism for a parts feeder.

A further object of the invention is to provide a parts feeder wherein a torsional force applied at a point spaced substantially from the central axis of the feeder give a rotational motion.

A still further object of this invention is to provide a parts feeder drive utilizing solenoids disposed at fixed spaced positions around the axis of the feeder and having one element thereof attached to the base and the other attached to the hopper thereof.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
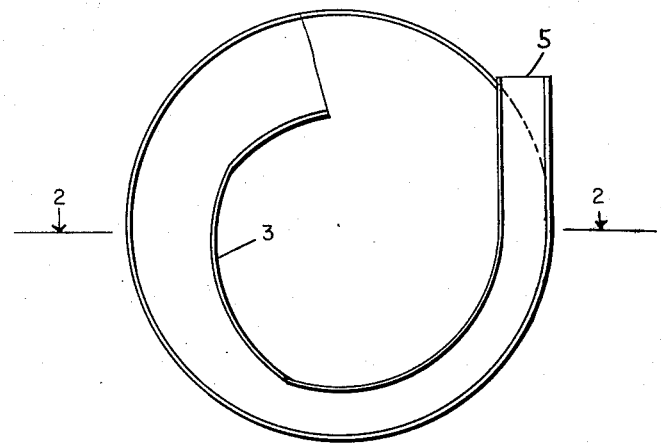
Fig. 1 is a top view of a parts feeder according to the invention.
Figures 2, 4:
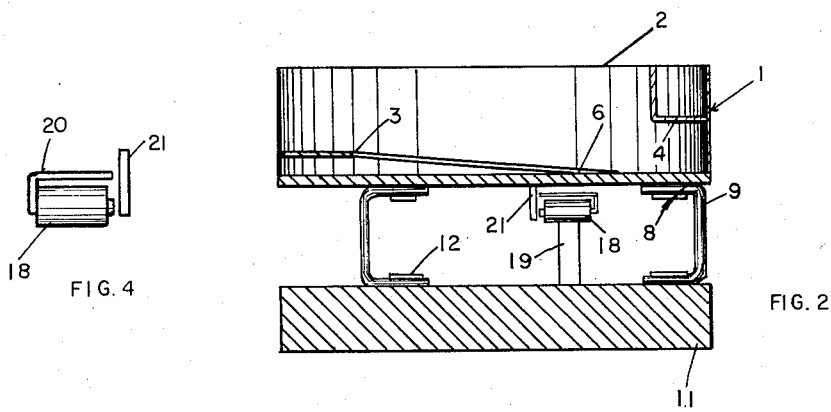
Fig. 2 is a cross sectional view taken on line 2—2 of Fig. 1.
Fig. 4 is an enlarged view of a motor means for the feeder.
Figure 3:
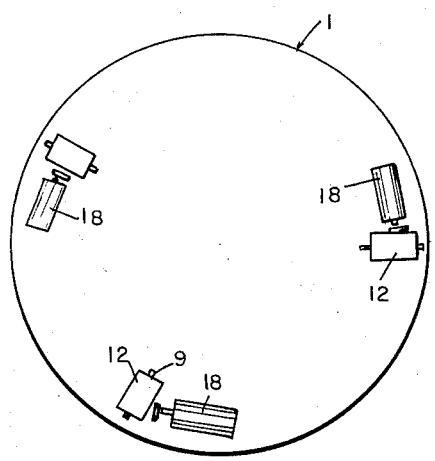
Fig. 3 is a bottom view of the feeder shown in Figs. 1 and 2.

The operation of the feeder disclosed herein has been explained in the said parent application and will not be reiterated at this time.

Now with more specific reference to the drawing, a parts feeder 1 is shown having a hopper 2 carried by a helical track 3. The helical track 3 has a bottom 4 which is adapted to discharge parts at 5 as they are moved up the helical track 3 and are dressed as they pass therearound.

The feeder 1 has a bottom 6 and springs 9 which are attached at their upper ends to the bottom 6 by means of clamps 8. The springs 9 are U-shaped and the clamp members 8 hold the ends thereof to the bottom 6 rigidly. The springs 9 could be made of straight leaf springs as is common in the art. The springs 9 are clamped to a base 11 by means of clamping members 12.

Torsional vibration is applied to the hopper 2 by means of motors made up of armatures 21 and solenoids 18. The solenoids 18 are disposed at spaced points around the axis of the bottom of the hopper 2. The solenoids 18 are supported on the base 11 by means of a bracket 19 and have U-shaped iron cores 20 which are magnetized by an electrical coil wrapped therearound. The iron armatures 21 are attached to the bottom plate on the hopper 2.

When the solenoids 18 are excited by intermittent D.C. electric current, each solenoid will pull the armature 21 toward the induced magnetizing force therein, exerting a force perpendicular to the central axis of the track 3. This will give the hopper 2 a twisting motion around the track 3. This will also cause it to move down and this will cause the parts to advance up the track 3 as disclosed in the said parent application.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A parts feeder comprising a base, a hopper generally cylindrical and having a helical track, spring means to support said hopper on said base, means to exert a torsional force on said track, said means comprising spaced solenoids attached to said base, spaced armature means attached to said hopper in close spaced proximity to said solenoids, and means to apply intermittent electrical impulses to said solenoids whereby said track is vibrated in a confined inclined helical path, said solenoids applying a force to said armature means in a direction perpendicular to the central axis of said helical track, said spring means being U-shaped and the end portions of said U-shaped spring means being attached one to said base and the other to said hopper of said feeder, the ends of said U-shaped spring means being disposed radially of said hopper.

References Cited in the file of this patent

UNITED STATES PATENTS

| | | |
|---|---|---|
| 2,658,609 | Weyandt | Nov. 10, 1953 |

FOREIGN PATENTS

| | | |
|---|---|---|
| 279,119 | Great Britain | Oct. 15, 1927 |
| 681,704 | Great Britain | Oct. 29, 1952 |